May 20, 1924.  1,494,450
F. J. TILLMAN
TESTING AND LOCKING DEVICE IN COMBINATION WITH CALCULATING MACHINES
Filed Aug. 25, 1919   6 Sheets-Sheet 1
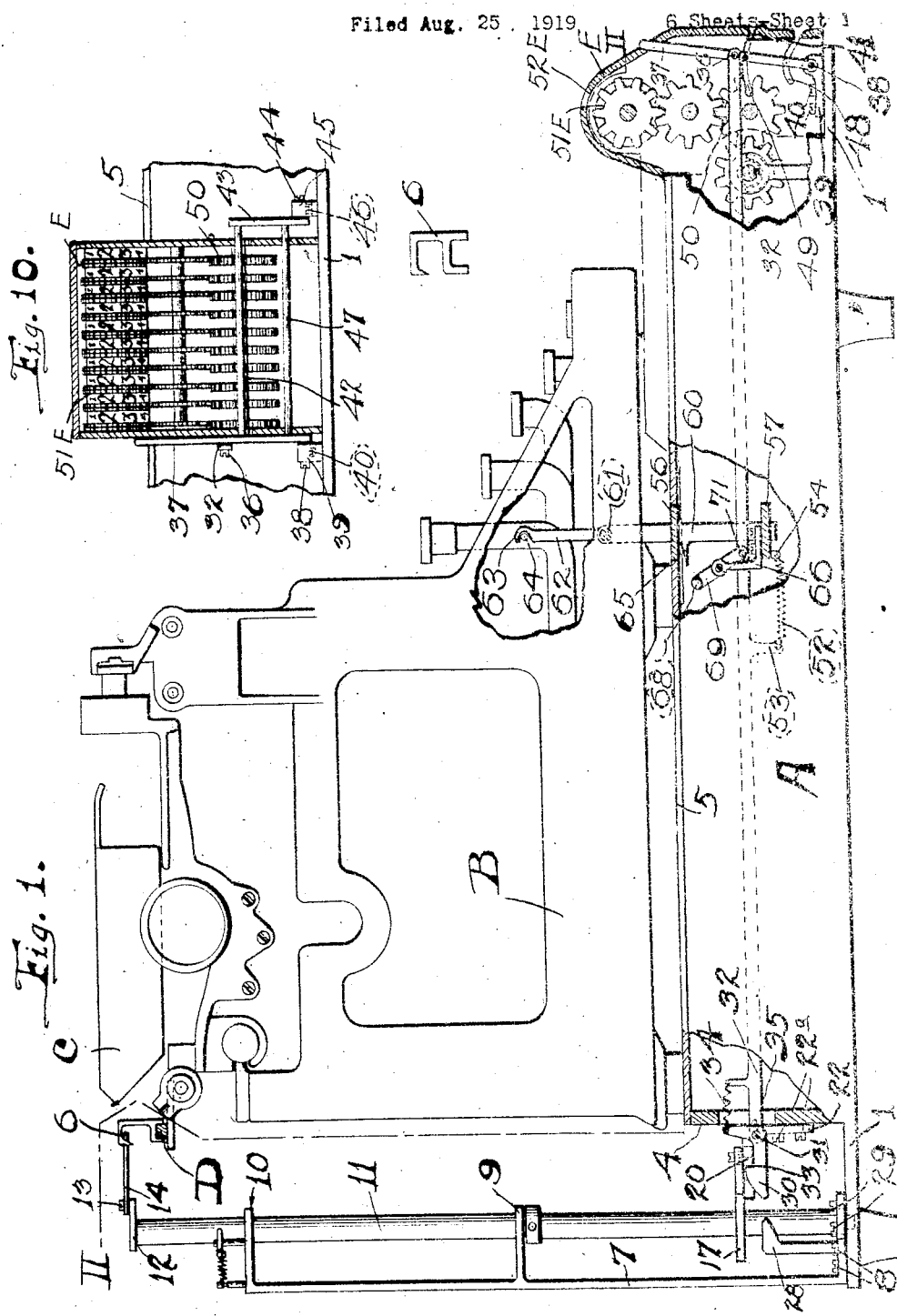
Attest:
Charles L. Edsorn.
A Hughes
Inventor:
Ferdinand J. Tillman

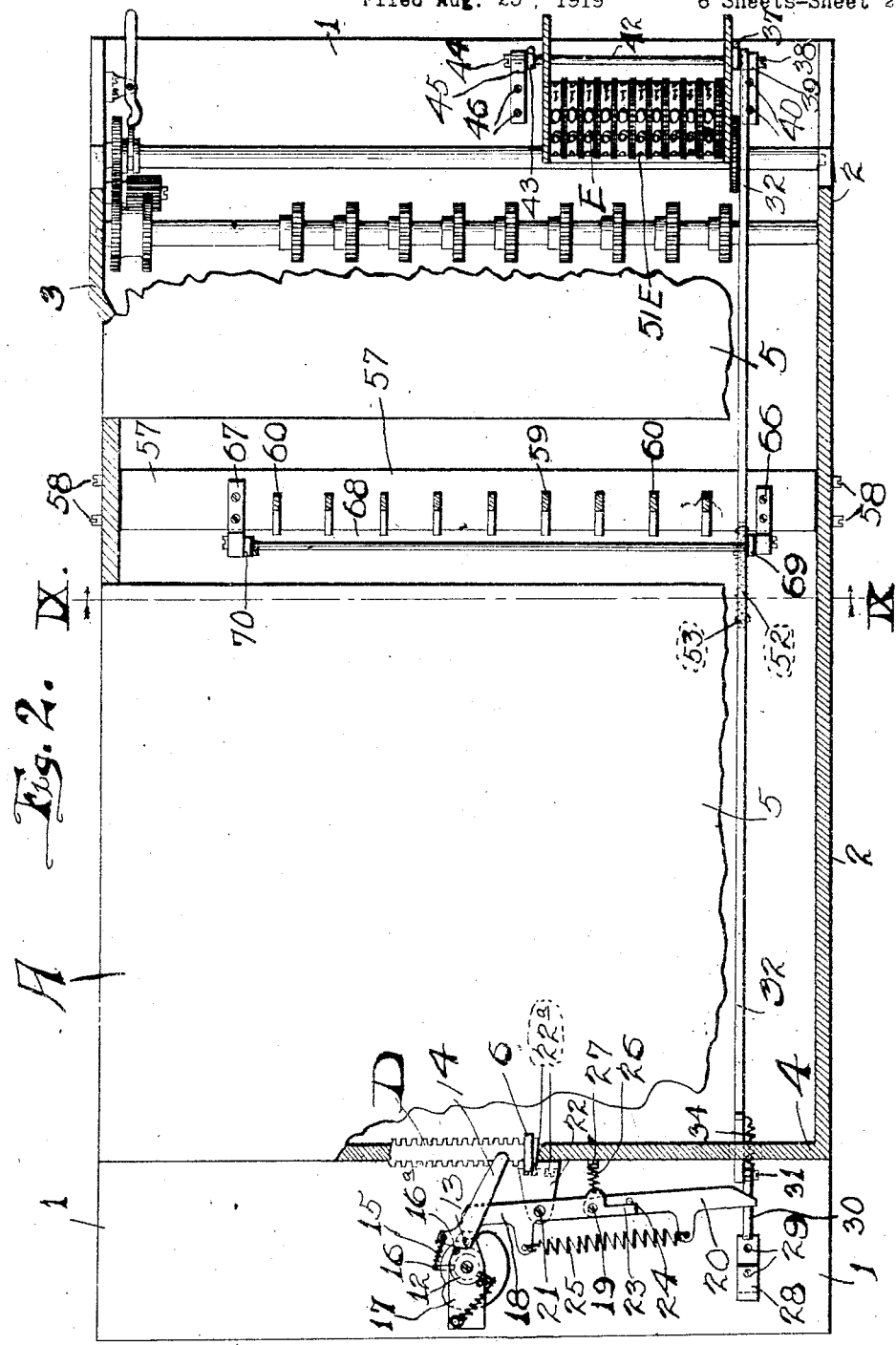

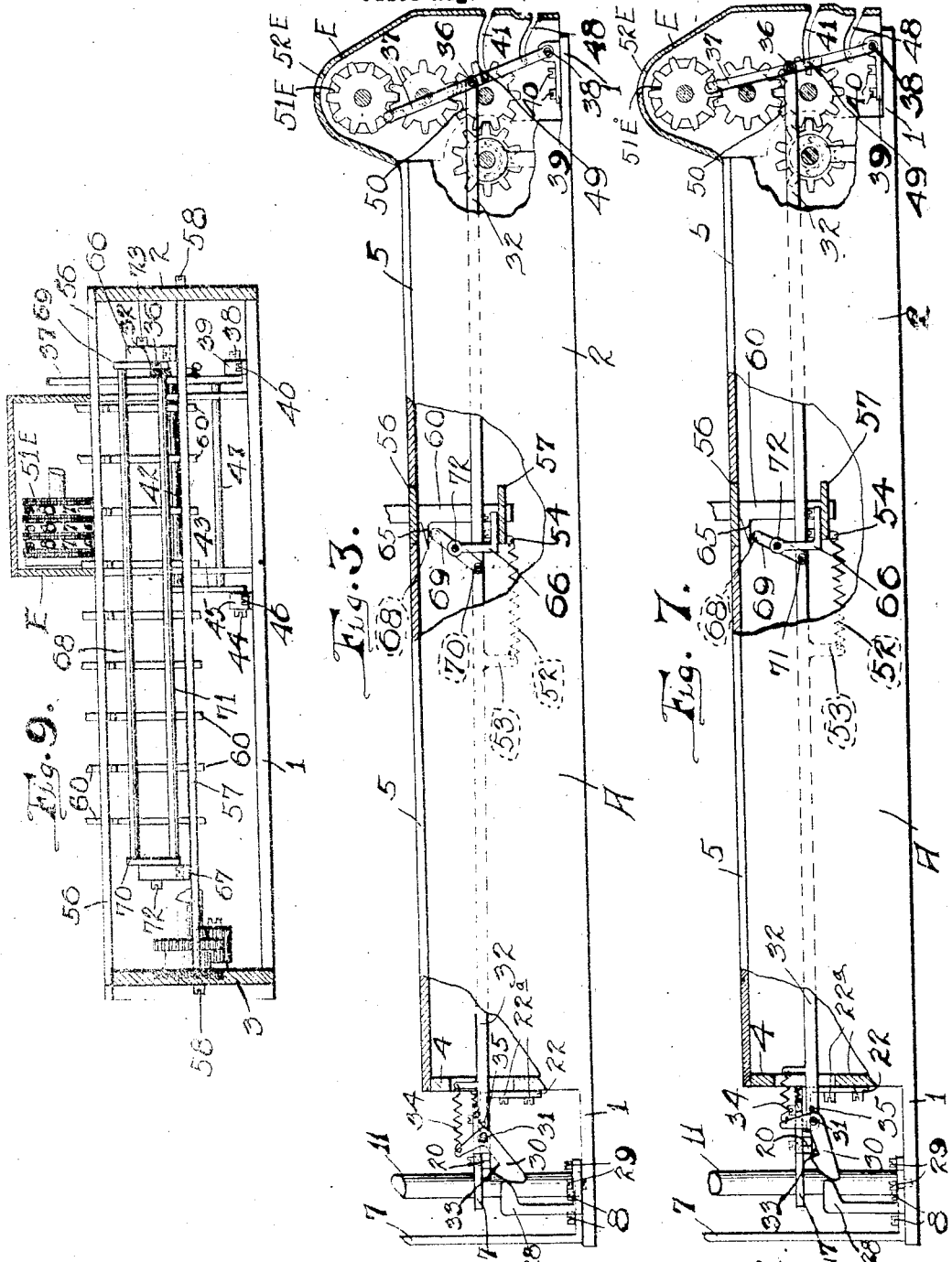

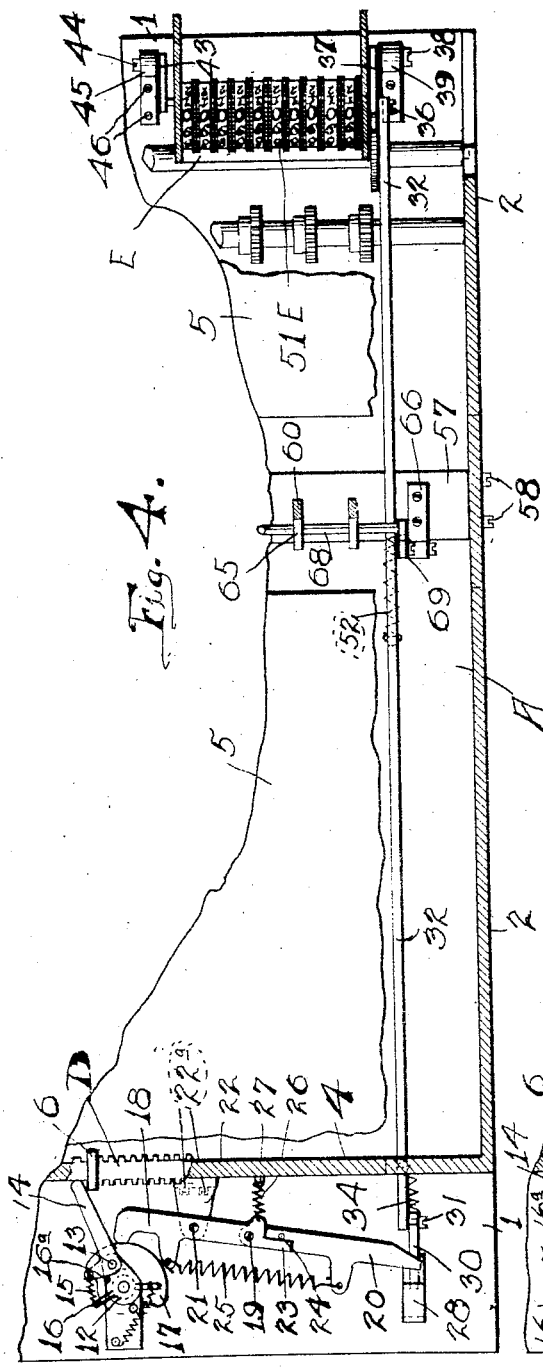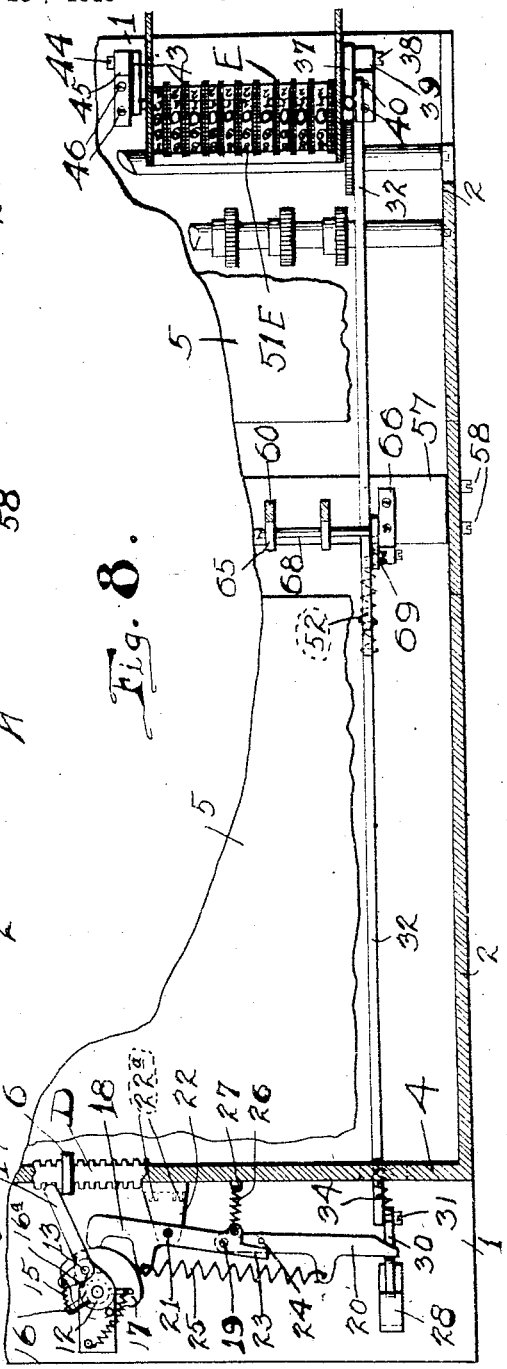

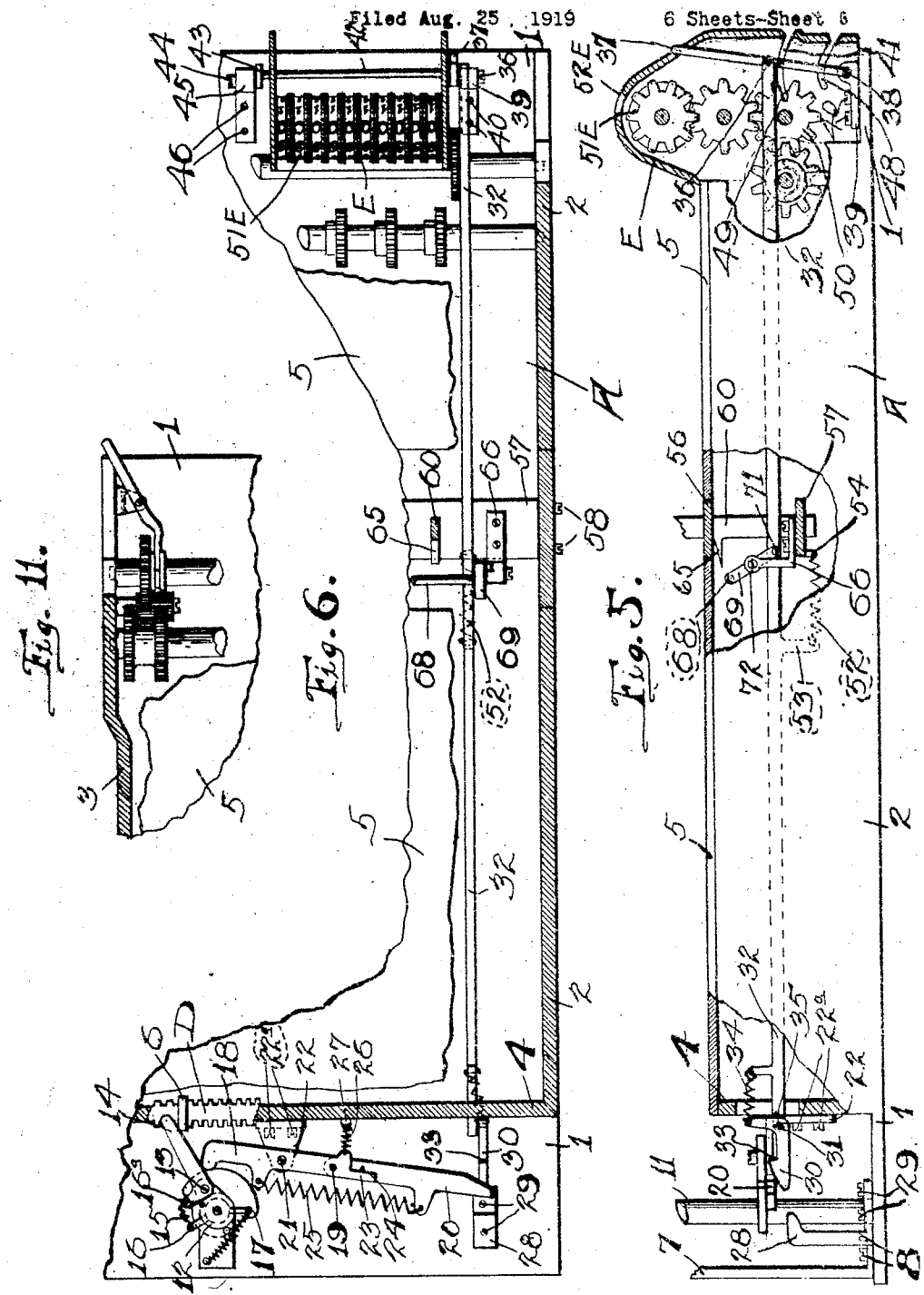

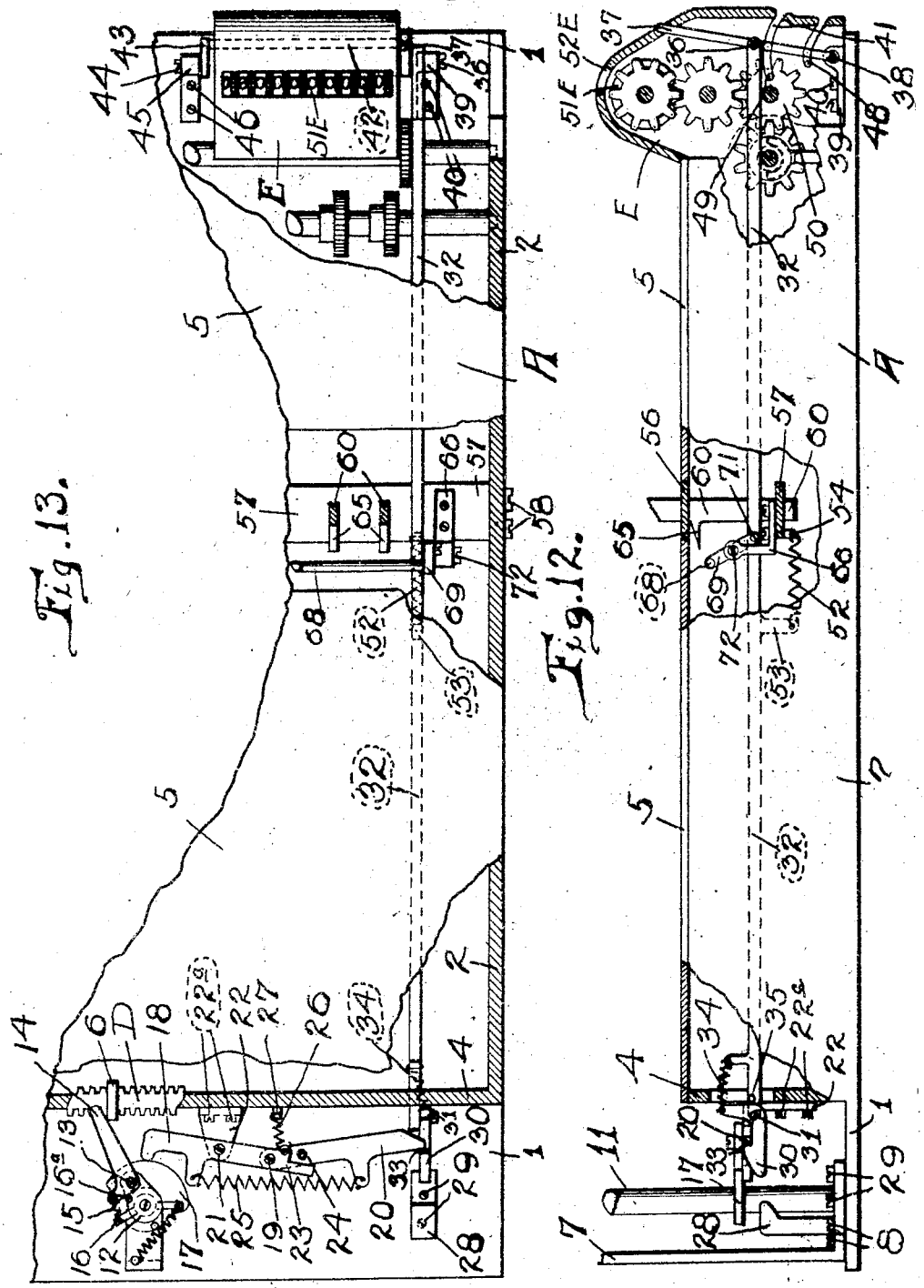

Patented May 20, 1924.

1,494,450

UNITED STATES PATENT OFFICE.

FERDINAND J. TILLMAN, OF ST. LOUIS, MISSOURI.

TESTING AND LOCKING DEVICE IN COMBINATION WITH CALCULATING MACHINES.

Application filed August 25, 1919. Serial No. 319,698.

*To all whom it may concern:*

Be it known that I, FERDINAND J. TILLMAN, a citizen of the United States of America, and resident of the city of St. Louis and State of Missouri, have invented certain new and useful Improvements in Testing and Locking Devices in Combination with Calculating Machines, of which the following is a specification.

In a calculating machine when starting a new calculation it is important to have the totalizer clear and all the numeral discs standing at zero, so the object of this invention is to provide a testing and locking mechanism to test the totalizer of a calculating machine when starting a new calculation to see if the totalizer is clear and standing at zero, and if not to automatically lock the key levers of a calculating machine. This invention is especially adapted for cross totaling work where items are printed in different columns on the paper but all calculations are carried in one totalizer as in U. S. Letters Patent No. 1,358,263, issued to me November 9, 1920, or as explained in the following example:

| Old account. | Merchandise. | New balance. |
|---|---|---|
| 25.00 | 10.00 | |
| | 40.00 | 75.00 |

When the 25.00 was printed on the paper carried by the typewriter carriage, the totalizer totaled 25.00 and as the 10.00 and 40.00 was printed on the paper, the totalizer added them, making the total 75.00 and before the operator printed the 75.00 on the paper, the calculating mechanism was changed from addition to subtraction and as the operator copied the 75.00 from the totalizer the machine subtracted 75.00 from the total 75.00 which left nothing in the totalizer and left all of the numeral discs standing at zero, but if an error was made in copying the total and only 65.00 copied from the totalizer in place of 75.00, 10.00 would be left in the totalizer and cause this calculation to be 10.00 short and the 10.00 left in the totalizer would be added to the next calculation and make the next calculation 10.00 over. This invention is to therefore provide a locking means for locking the keys of the calculating machine when in the first column unless the totalizer is clear and standing at zero.

This testing and locking mechanism is shown in connection with a calculating machine operated by a typewriter but some of the calculating parts are omitted to simplify the case. These parts are shown in pending application Serial No. 272,612, filed Jan. 23, 1919, and this mechanism can be used in connection with any calculating machine that uses a traveling platen carriage and a totalizer so only parts pertaining to this invention are shown.

Other and further objects will appear in this specification and be specifically pointed out in the appended claims reference being had to the accompanying drawings exemplifying the invention and in which;

Fig. 1 is a side elevation of a typewriter mounted on a calculating machine, both being partly broken away to expose the interior parts, particularly the testing and locking mechanism associated therewith.

Fig. 2 is a sectional view taken on a line II—II of Fig. 1 partly broken away, with the totalizer standing at zero and the testing and locking mechanism in their normal positions before being operated.

Fig. 3 is a side elevation of a calculating machine partly broken away with the totalizer standing at zero and the testing and locking mechanism associated therewith operated, tripped and about to return and unlock the key levers.

Fig. 4 is a fragmentary top view of Fig. 3 partly broken away with the totalizer standing at zero and the testing and locking mechanism associated therewith operated, tripped and about to return and unlock the key levers.

Fig. 5 is a side view of the calculating mechanism partly broken away with the totalizer standing at zero and the testing and locking mechanism tripped and returned and the key lever unlocked.

Fig. 6 is a fragmentary top view of Fig. 5 partly broken away with the totalizer standing at zero and the testing and locking mechanism tripped and the key levers locked.

Fig. 7 is a side elevation of the calculating machine partly broken away with the totalizer not standing at zero and the testing and locking mechanism operated and the key levers locked.

Fig. 8 is a fragmentary top view of Fig. 7 partly broken away with the totalizer not standing at zero and the testing and locking mechanism operated and the key levers unlocked.

Fig. 9 is a sectional view taken on line IX—IX of Fig. 2 showing the testing and locking mechanism with the calculating parts broken away, so the testing and locking bars can readily be seen.

Fig. 10 is a view of the totalizer showing the testing bar of the locking mechanism.

Fig. 11 is a fragmentary view taken from Fig. 2 showing the gear used in connection with the calculating machine, shifted into a subtracting position.

Fig. 12 is a side view of the calculating machine with the totalizer not standing at zero and the totalizer and key levers unlocked manually by the operation of the handle in opposition to the testing and locking mechanism.

Fig. 13 is a fragmentary top view of the calculating machine with the totalizer not standing at zero and the totalizer and key levers unlocked manually by the operation of the handle in opposition to the testing and locking mechanism.

Referring to the drawings 1 designates the base of the machine 2 and 3 are side walls, 4 is the back wall and 5 is the top cover. This constitutes the housing for the calculating machine which will hereafter be referred to as A. Upon this calculating machine A a typewriter B is set, the typewriter B having a traveling platen carriage C provided with a toothed bar D movable to and fro with said carriage, said toothed bar D adapted to receive driver 6 which is adapted to serve as an actuating member when carriage C is drawn back to the far left hand side for the purpose of starting a new column. A supporting frame 7 is mounted and secured to the base 1 by screws 8 and contains two bearings 9 and 10 through which a vertical rock-shaft 11 is adapted to rock. Rigidly secured on the upper end of this vertical rock-shaft 11 is an arm 12 and to this arm 12 pivoted at 13 is another arm 14 which is adapted to be engaged by the driver 6. To this arm 14 is fastened a spring 15, which fastens to a stud 16 in the vertical rock-shaft 11, and this spring 15 has a tendency to pull arm 14 against a stop pin 16ª on the arm 12 as shown in Figs. 2, 4, 6, and 8. The lower end of the vertical rock-shaft 11 is journaled in the base 1, and near its lower end, rigidly fastened is a cam 17. Abutting the cam 17 is an arm 18, which is pivoted at 21 to bearing 22, which is fastened to the back wall 4 by screws 22ª. On arm 18, pivoted at 19 is another arm 20. On arm 18 is an extension 23 that abuts against a stop pin 24 on the arm 20, and is normally held in this position by spring 25. The spring 25 is fastened at one end to the arm 18 and at the other end to the arm 20. The spring 25 has a tendency to hold the extension 23 of arm 18 against the stop pin 24 of arm 20 as shown in Figs. 2, 4, and 6. A spring 26 is fastened at one end to arm 18 and its other end is fastened to a stud 27 in the back wall 4. This spring 26 has a tendency to hold arm 18 against the cam 17. 28 is a tripping abutment secured to the base 1 by screws 29. 30 is a trip member pivoted at 31 to a pull rod 32, the trip member 30 containing a holding notch 33 adapted to receive the end of the arm 20. To the upper end of the trip member 30 a spring 34 is fastened and the opposite end of spring 34 is fastened to an extension of the pull rod 32. The spring 34 has a tendency to hold the trip member 30 in an upward position against a stop pin 35 on the pull rod 32. The forward end of the pull rod 32 is pivoted at 36 to a handle 37. The lower part of handle 37 is pivoted at 38 to a bearing 39 which is fastened to the base 1 by screws 40. 41 is a slot cut in the sides of the totalizer E through which a testing rod 42 is adapted to slide, and this testing rod 42 is securely fastened to the handle 37 at one end and the other end is securely fastened to an upward extending arm 43. This upward extending arm 43 is pivoted at 44 to a bearing 45 which is fastened to the base 1 by screws 46. 47 is a brace rod securely fastened at one end to handle 37 and its opposite end is securely fastened to the upward extending arm 43 best shown in Figs. 9 and 10. This brace rod 47 passes through a slot 48 cut in the sides of the totalizer E. It will now be explained that the testing rod 42, the handle 37, the upward extending arm 43, and the brace rod 47 constitute a rockable frame for testing the totalizer when starting a new column to see if all of the numeral discs of the totalizer are standing at zero. 49 is a long slot cut in each of the transmission gears 50 of the totalizer E, in a position corresponding to the zero on the numeral disc 51ᴱ shown through the sight opening 52ᴱ of the totalizer E. The totalizer E will not be explained in detail as this invention can be used with many forms of totalizers. All that it is necessary to have in order to use this invention, with any make of a totalizer is to have a long slot 49 cut in one set of the transmission gears in which the testing rod 42 may enter when all the slots 49 are in proper alignment at which time all the numeral discs in the totalizer are standing at zero.

It will now be explained that when the typewriter carriage C is drawn back for starting its first column, that the driver 6 on the toothed bar D will engage the arm 14 and force it against stop pin 16ª, and thereby cause the arm 12 to rotate the vertical rock shaft 11, and the cam 17 on the lower part of the vertical rock-shaft 11 will turn and force the arm 18 upon the raised surface of the cam 17 and the arm 18 through the influence of spring 25 will cause the arm 20 to move rearwardly, and arm 20 being caught over the trip member 30 thereby will force the pull rod 32 in a backward position and rock the testing rod 42 into the long tooth slot 49 and if the totalizer E is standing at zero, the testing arm 42 can enter the slot 49 and thereby allow pull rod 32 to go back a great enough distance to allow the trip member 30 to engage the tripping abutment 28 and thereby cause notch 33 to release from arm 20, so that the pull rod 32 and the testing rod 42 will be returned to their original position as shown in Figs. 5 and 6, through the influence of a spring 52 which is fastened to an extension 53 of pull rod 32, the opposite end of spring 52 being fastened to a stud 54 which is fastened to a cross-bar 57. As the pull rod 32 was pulled forward by the spring 52, the testing bar 42 was forced out of mesh of the long slot 49 of the gears 50 thereby allowing the gears 50 of the totalizer E to be rotated, which indicates that the totalizer is clear and standing at zero and free to start a new calculation. If some of the totalizer wheels did not stand at zero, the slots 49 would not be in alignment, and the motion of test rod 42 would be limited by the periphery of such wheels. Thus the rod 32 could not be sufficiently retracted to enable the tripping abutment 28 to release the arm 20 from the notch 33. This condition is illustrated in Figs. 7 and 8, the totalizer wheels being locked. Further retraction of the carriage and consequent rotation of cam 17 withdraw arm 23 from stop pin 24 against the tension of spring 25. The operator is now prevented from running numbers into the totalizer until the arm 42 is manually withdrawn by means of lever 37.

A method for locking the key levers of the calculating machine when the totalizer is locked, will now be described:

This is accomplished through pull rod 32, and as shown in Fig. 9, a guide plate 56 is fastened to the tops of the side walls 2 and 3, and below and parallel to this guide plate 56, is another guide plate 57 which is fastened to the side walls 2 and 3 by screws 58 as best shown in Figs. 2 and 9. Cut in each of the guide plates 56 and 57 and spaced apart in alignment with each numeral key of the typewriter is a guide slot 59 through which sliding calculating key levers 60 are adapted to slide and on the upper end of these sliding calculating key levers 60, pivoted at 61 are arms 62 the upper portions of which are provided with a hook 63 which is adapted to fit over a stud 64 on the typewriter key levers, as shown in Fig. 1. Each of these sliding calculating key levers 60 has a locking portion 65. Upon the lower guide plate 57, best shown in Figs. 2 and 9 are two bearings 66 and 67 and journaled in these bearings 66 and 67 is a rockable frame consisting of a lock bar 68 that is fastened at one end to an arm 69 and at the other end to an arm 70, and there being a bar 71 fastened at one end to arm 70 which passes through the pull rod 32 and is fastened at its other end to arm 69 and is operated by said pull rod 32. Arms 69 and 70 are pivoted at 72 and 73 to the bearings 66 and 67. This constitutes a locking rockable frame.

It will now be understood that when the pull rod 32 was held in the rearward position as just described, when the totalizer E was locked, as shown in Figs. 7 and 8, the bar 71 was held in a rearward position as well as the arms 69 and 70, and as said arms 69 and 70 are pivoted approximately in the center, the upper ends of arms 69 and 70 were held in a forward position thereby causing the lock rod 68 to be held in a forward position underneath the locking portions 65 of the sliding calculating key levers 60 thereby locking the sliding calculating key levers 60 from operation. It will of course be understood that any time the pull rod 32 is held in a rearward position that the totalizer E will be locked as well as the sliding calculating key levers 60, and that any time the pull rod 32 is held in its normal forward position through spring 52, the totalizer E and the key levers 60 will be unlocked and free to be operated.

From the disclosure of the drawings relative to the dog 14 which is to be operated by the driver 6, said driver is so set on the toothed bar D for operation in the first column only, as described as old account column, it not being the intent of said driver to travel beyond the dog 14, as the marginal stop, not shown, is previously set so as to stop further actuation on the carriage to the right.

What I claim is:

1. In a calculating machine, the combination of a typewriter carriage, a totalizer, a gear wheel having a slot formed therein for determining the zero position thereof, and a swingable member adapted to enter said slot of said wheel, and means operated by said carriage adapted to bring said member in contact with said wheel and thereby mechanically determine whether or not said wheel is in its zero position.

2. In a calculating machine, the combination of a typewriter carriage, a totalizer, a set of numeral wheels, each having a slot formed therein for determining the zero position thereof, a member parallelling said wheels and swingably related thereto, and means operated by said carriage for bringing said member in a position to engage said slots of said wheels.

3. In a calculating machine, the combination of a typewriter carriage, a totalizer gear wheel having a slot formed therein for determining the zero position thereof, a swingable member adapted to enter said slot of said wheel, a key lever attachment, and means operated by said carriage co-operable with said member and said key lever attachment for actuating said member.

4. In a calculating machine, the combination of a typewriter carriage, a totalizer gear wheel having a slot formed therein for determining the zero position thereof, a swingable member adapted to enter said slot of said wheel, a key lever attachment, means operated by said carriage for actuating said member to a position of engagement with the slot of said wheel, said means being co-operable with said lever attachment for preventing said attachment being operated when said member is out of engaging alinement with the slot of said wheel.

5. In a calculating machine, the combination of a typewriter carriage a totalizer gear wheel having a curved slot formed therein for determining the zero position thereof, a swingable member adapted to enter said slot of said wheel, a key lever attachment, means for actuating said member from said carriage to a position of engagement with the slot of said wheel, said means being co-operable with said lever attachment for preventing said attachment being operated when said member is out of engaging alinement with the slot of said wheel, and other means for releasing said member operating means after said member has been actuated.

6. In a calculating machine, the combination of a typewriter carriage and a totalizer, a set of numeral wheels, a testing member for said wheels, co-operable means formed on each of said wheels for co-operation with said member, means for operating said member from said carriage, said member adapted to simultaneously co-operate with and test all of said wheels.

7. In a calculating machine, the combination of a totalizer, a gear wheel having means formed thereon for determining its zero position, a testing member for said wheel having means for co-operation with said determining means of said wheel, a carriage bearing a driver, a pair of co-operable levers spring actuated relative to each other adapted to be actuated by said driver, and a shifting member connected to said testing member and one of said levers for operating said testing member.

8. In a calculating machine, the combination of a totalizer, a set of transmission wheels, a rack bar bearing a driver, a testing member for said wheels for simultaneously determining their zero positions, means formed on each of said wheels for co-operation with said member, a series of digit bearing members, means for preventing actuation of said digit bearing members, and other means for operating said testing member adapted to be operated by said driver, said last mentioned means being co-operable with said preventing means of said digit bearing members.

9. In a combined typewriter and computing mechanism, a travelling carriage, a totalizer, gear wheels co-operable with said totalizer having means formed thereon for determining the zero position thereof, a testing member for said wheels having a co-operable portion for the determining means of said wheels, a driver borne by said carriage, a cam bearing shaft to be operated by said driver, a pair of pivoted together levers yieldingly connected to one another one of which is co-operable with said cam, and a pull-rod connected to said testing member and co-operable with said other lever.

10. In a combined typewriter and computing mechanism, a travelling carriage, key levers having depending portions, a totalizer, gear wheels co-operable with said totalizer having means formed thereon for determining the zero position thereof, a testing member for said wheels having a co-operable portion for the determining means of said wheels, a driver borne by said carriage, a cam bearing shaft to be operated by said driver, a pair of pivoted together levers yieldingly connected to one another one of which is co-operable with said cam, a pull-rod connected to said testing member co-operable with said other lever and a locking mechanism to be actuated by said pull-rod co-operable with said depending portions of said key levers.

FERDINAND J. TILLMAN.